(12) United States Patent
Maeda

(10) Patent No.: US 8,120,738 B2
(45) Date of Patent: *Feb. 21, 2012

(54) LIQUID CRYSTAL DISPLAY DEVICE AND ELECTRONIC APPARATUS

(75) Inventor: Tsuyoshi Maeda, Kai (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/481,370

(22) Filed: Jun. 9, 2009

(65) Prior Publication Data

US 2009/0268140 A1 Oct. 29, 2009

Related U.S. Application Data

(63) Continuation of application No. 11/017,134, filed on Dec. 21, 2004, now Pat. No. 7,564,524.

(30) Foreign Application Priority Data

Jan. 14, 2004 (JP) .................................. 2004-006783
Aug. 31, 2004 (JP) .................................. 2004-251482

(51) Int. Cl.
*G02F 1/1337* (2006.01)

(52) U.S. Cl. ........................................ 349/129; 349/130

(58) Field of Classification Search ........................ None
See application file for complete search history.

(56) References Cited

U.S. PATENT DOCUMENTS

| 6,266,122 | B1 | 7/2001 | Kishimoto et al. |
| 6,525,794 | B1 | 2/2003 | Kim et al. |
| 6,525,797 | B2 | 2/2003 | Tsuda et al. |
| 6,633,356 | B1 | 10/2003 | Kataoka et al. |
| 6,678,031 | B2 | 1/2004 | Song |
| 6,774,967 | B2 | 8/2004 | Kim et al. |
| 6,801,267 | B2 | 10/2004 | Satake |
| 6,836,308 | B2 | 12/2004 | Sawasaki et al. |
| 6,897,924 | B2 | 5/2005 | Tashiro et al. |
| 6,900,863 | B2 | 5/2005 | Okamoto et al. |

(Continued)

FOREIGN PATENT DOCUMENTS

JP 05-002161 1/1993

(Continued)

OTHER PUBLICATIONS

A. Takeda et al.; "41.1: A Super-High Image Quality Multi-Domain Vertical Alignment LCD by New Rubbing-Less Technology"; *SID 1998 DIGEST*; 41.1.

(Continued)

*Primary Examiner* — Lucy Chien

(74) *Attorney, Agent, or Firm* — Oliff & Berridge, PLC

(57) ABSTRACT

A liquid crystal display device with a vertical alignment mode in which a high image quality and a wide viewing angle are secured includes a liquid crystal layer having an initial state of vertical alignment interposed between a pair of substrates opposite to each other. A plurality of alignment control structures including a dielectric protrusion protruded toward the liquid crystal layer from the inner surface of the substrate is provided in a dot area constituting one unit of display. When that the dielectric constant of the dielectric protrusion is $\epsilon_{t1}$, the dielectric constant of a major axis direction of liquid crystal molecules constituting the liquid crystal layer is $\epsilon_{//}$, and the dielectric constant of a minor axis direction thereof is $\epsilon_\perp$, the dielectric constants satisfy the expression $\epsilon_\perp > \epsilon_{//} > \epsilon_{t1}$.

8 Claims, 11 Drawing Sheets

U.S. PATENT DOCUMENTS

| | | |
|---|---|---|
| 6,924,856 B2 | 8/2005 | Okumura et al. |
| 7,247,411 B2 | 7/2007 | Song |
| 7,342,630 B2 | 3/2008 | Satake |
| 2001/0022643 A1 | 9/2001 | Kim et al. |
| 2002/0008827 A1 | 1/2002 | Yoo et al. |
| 2002/0080320 A1 | 6/2002 | Suzuki et al. |
| 2002/0163610 A1* | 11/2002 | Liao et al. .................... 349/113 |
| 2003/0058374 A1 | 3/2003 | Takeda et al. |
| 2004/0119924 A1 | 6/2004 | Takeda et al. |
| 2005/0151907 A1 | 7/2005 | Maeda |
| 2005/0190318 A1 | 9/2005 | Okumura et al. |
| 2007/0216831 A1 | 9/2007 | Song |
| 2009/0201448 A1 | 8/2009 | Song |

FOREIGN PATENT DOCUMENTS

| | | |
|---|---|---|
| JP | 11-242225 | 9/1999 |
| JP | B2-2947350 | 9/1999 |
| JP | 2000-019522 | 1/2000 |
| JP | A-2001-013487 | 1/2001 |
| JP | 2001-242466 | 9/2001 |
| JP | A-2001-337332 | 12/2001 |
| JP | A-2002-162627 | 6/2002 |
| JP | A-2002-214632 | 7/2002 |
| JP | 2002-287158 | 10/2002 |
| JP | 2003-167253 A | 6/2003 |
| JP | 2003-177384 | 6/2003 |
| JP | A-2003-215613 | 7/2003 |
| JP | 2003-222869 | 8/2003 |
| JP | A-2003-222869 | 8/2003 |
| JP | 2003-255395 | 9/2003 |
| JP | 2003-315803 | 11/2003 |
| KR | 2000-26400 A | 5/2000 |
| KR | 2002-0020457 | 3/2002 |
| KR | 2002-0041279 | 6/2002 |
| KR | 2002-79583 A | 10/2002 |
| TW | 559871 | 11/2003 |
| TW | 565732 | 12/2003 |
| TW | 567378 | 12/2003 |

OTHER PUBLICATIONS

"Liquid Crystals—Applications and Uses"; 1990; pp. 146-147; vol. 1; World Scientific Publishing Co.; Singapore.

* cited by examiner

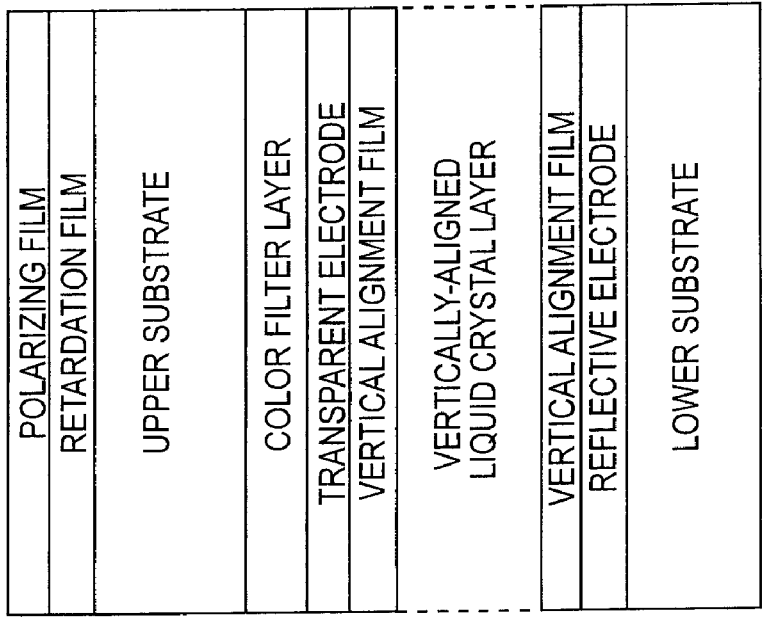
FIG. 11B
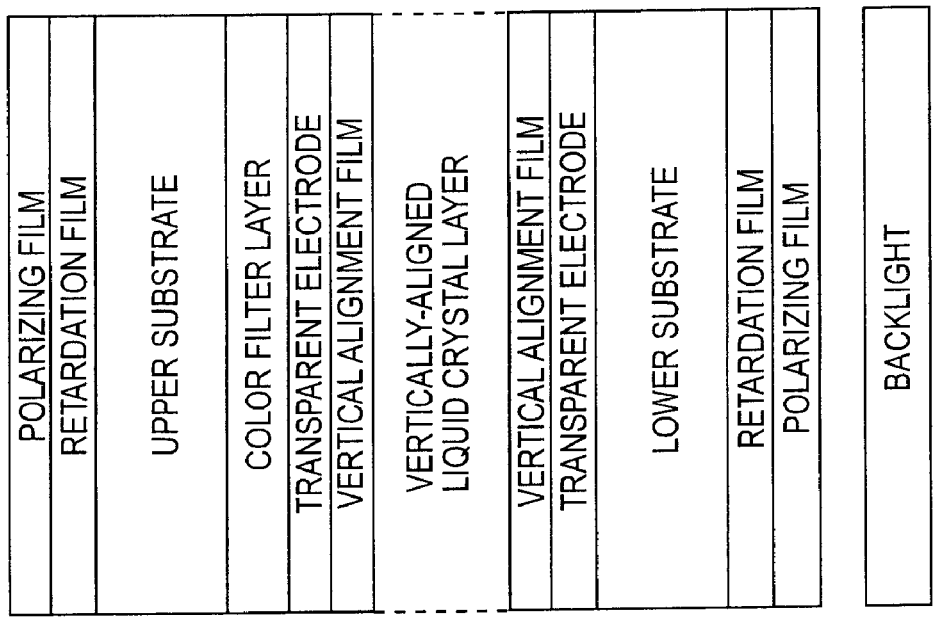
FIG. 11A

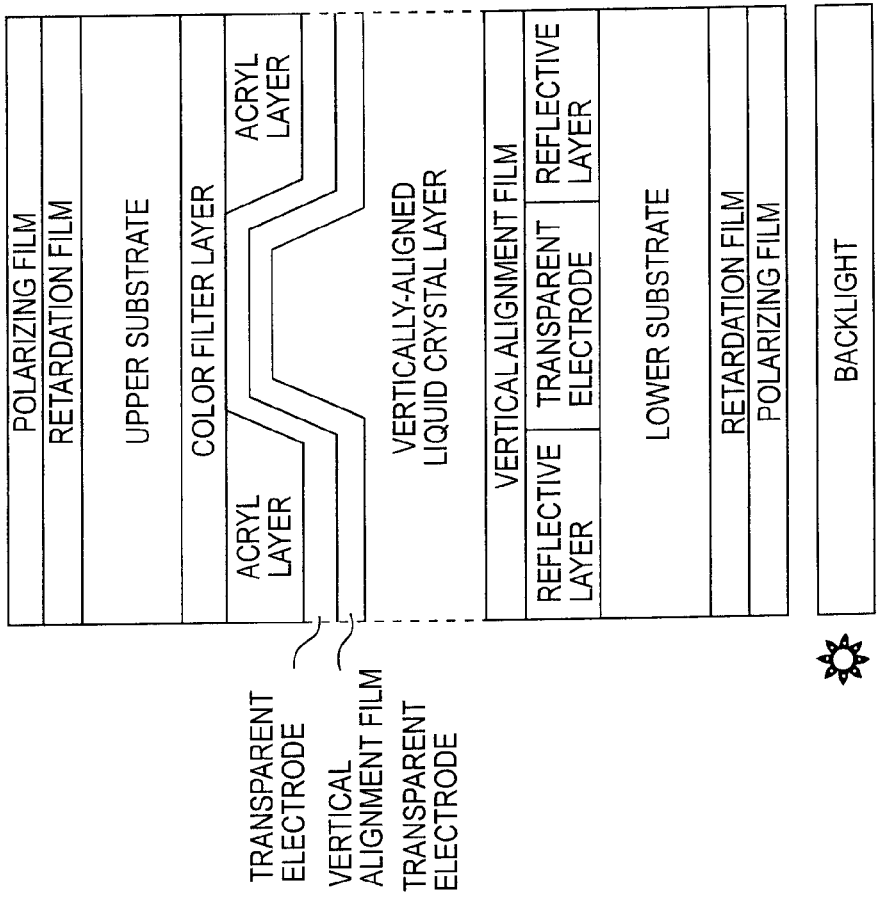
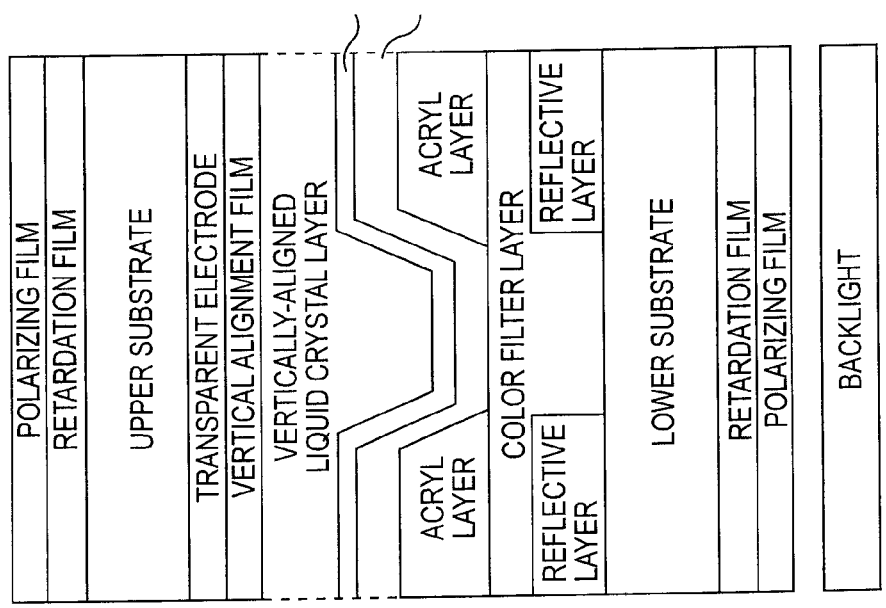

TRANSMISSIVE DISPLAY AREA ← → REFLECTIVE DISPLAY AREA

LIQUID CRYSTAL DISPLAY DEVICE AND ELECTRONIC APPARATUS

This is a Continuation of application Ser. No. 11/017,134 filed Dec. 21, 2004 now U.S. Pat. No. 7,564,524. This application claims the benefit of Japanese Patent Application Nos. JP 2004-006783, filed Jan. 14, 2004 and JP 2004-251482, filed Aug. 31, 2004. The disclosure of the prior applications is hereby incorporated by reference herein in its entirety.

BACKGROUND

The exemplary embodiments of the present invention relate to a liquid crystal display device and an electronic apparatus.

In the related art, liquid crystal display devices with a liquid crystal mode of vertical alignment were widely utilized. In this kind of liquid crystal display device, it is necessary to properly control a direction in which liquid crystal molecules aligned vertically to a substrate fall down at the time of applying a voltage, and there has been thus suggested that alignment control structures including slits (notched portions) or dielectric protrusions for the purpose of controlling the alignment of the liquid crystal molecules are provided in electrodes (see Japanese Patent No. 2947350). The arrangement conditions of the dielectric protrusions have been studied (see A Super-High Image Quality Multi-Domain Vertical Alignment LCD by New Rubbing-Less Technology, SID1998 DIGEST 41.1).

SUMMARY

It is effective for a high image quality of liquid crystal display devices with a vertical alignment mode that the alignment control structures are provided and the arrangement conditions, etc. are properly set as in the related art. However, as a result of repeated studies by the inventor of the present invention for a higher image quality and a wider viewing angle of a liquid crystal display device with a vertical alignment mode, when the dielectric protrusions are provided as the alignment control structures, it was discovered that it is necessary to provide dielectric protrusions having a proper characteristic depending upon characteristics of liquid crystal molecules. That is, it was discovered that when such optimization is not performed, the image quality may be deteriorated in the conventional liquid crystal display devices performing the alignment control of the vertically-aligned liquid crystal by way of the dielectric protrusions. Therefore, the exemplary embodiments address or solve the above and/or other problems by providing a liquid crystal display device with a vertical alignment mode for realizing a high image quality and a wide viewing angle.

In order to address or accomplish the above, the exemplary embodiments provide a liquid crystal display device in which a liquid crystal layer having an initial state of vertical alignment is interposed between a pair of substrates having electrodes on opposing surfaces thereof, a dot area constituting one unit of display, a dielectric protrusion protruded toward the liquid crystal layer being formed on the electrode of one substrate of the pair of substrates and an alignment control structure being provided at a position adjacent to the dielectric protrusion as seen two-dimensionally on the opposing surface of an other substrate of the pair of substrates, and when a dielectric constant of the dielectric protrusion is $\epsilon_{r1}$, a dielectric constant of a major axis direction of liquid crystal molecules constituting the liquid crystal layer is $\epsilon_{//}$, and a dielectric constant of a minor axis direction thereof is $\epsilon_\perp$, the expression $\epsilon_\perp > \epsilon_{//} > \epsilon_{r1}$ is satisfied. Accordingly, in the liquid crystal display device including a dielectric protrusion as an alignment control structure of vertically-aligned liquid crystal, when the dielectric constant of the dielectric protrusion is smaller than the dielectric constant of the major axis direction of the liquid crystal molecules, the alignment control of the liquid crystal molecules in the dot area can be satisfactorily performed, so that it is possible to obtain high-brightness display.

The exemplary embodiments also provide a liquid crystal display device in which a liquid crystal layer having an initial state of vertical alignment is interposed between a pair of substrates having electrodes on opposing surfaces thereof, in a dot area constituting one unit of display, one substrate of the pair of substrates is provided with a dielectric protrusion protruded toward the liquid crystal layer from the electrode of the substrate and an alignment control structure disposed adjacent to the dielectric protrusion, and when that the dielectric constant of the dielectric protrusion is $\epsilon_{r1}$, the dielectric constant of a major axis direction of liquid crystal molecules constituting the liquid crystal layer is $\epsilon_{//}$, and the dielectric constant of a minor axis direction thereof is $\epsilon_\perp$, the expression $\epsilon_{r1} > \epsilon_{//}$ is satisfied. Accordingly, in the liquid crystal display device including a dielectric protrusion as an alignment control structure of vertically-aligned liquid crystal, when the dielectric constant of the dielectric protrusion is greater than the dielectric constant of the major axis direction of the liquid crystal molecules, the alignment control of the liquid crystal molecules in the dot area can be satisfactorily performed, so that it is possible to obtain high-brightness display. In addition, since the alignment control structure is provided only on one substrate, the liquid crystal display device can be more easily manufactured, so that enhancement of a manufacturing yield can be expected.

Therefore, in accordance with each of the above described exemplary embodiments, in the liquid crystal display device having the dielectric protrusion as the alignment control structure of the vertically-aligned liquid crystal molecules, since the behavior of different liquid crystal molecules at the time of applying a voltage can be suitably controlled in accordance with the dielectric constant of the dielectric protrusion, it is possible to provide a liquid crystal display device capable of accomplishing high-quality display.

In the liquid crystal display device according to the exemplary embodiments, the alignment control structure adjacent to the dielectric protrusion may be one of an opening slit formed in the electrode provided in the dot area and an edge portion of the electrode.

In the liquid crystal display device according to the exemplary embodiments, the alignment control structure adjacent to the dielectric protrusion may be another dielectric protrusion, and when the dielectric constant of the other dielectric protrusion is $\epsilon_{r2}$ and the dielectric constant of the liquid crystal molecules is $\epsilon_{//}$, the expression $\epsilon_{//} > \epsilon_{r2}$ may be satisfied.

In the liquid crystal display device according to the exemplary embodiments having the above described features, as the alignment control structure adjacent to the dielectric protrusion, the alignment control of the liquid crystal molecules at the time of applying a voltage may be performed by way of an oblique electric field generated from the edge portions of the electrode, and the alignment control may be also performed by means of distorting an electric field resulting from providing a protrusion having different dielectric constant in the liquid crystal layer.

In the liquid crystal display device according to the exemplary embodiments, the alignment control structure adjacent to the dielectric protrusion may include an opening slit formed on the electrode provided in the dot area and another dielectric protrusion which is provided inside the opening slit and of which the dielectric constant $\epsilon_{r2}$ satisfies the expression $\epsilon_{//}>\epsilon_{r2}$. Accordingly, since the alignment control structure for performing the alignment control of the liquid crystal molecules using the oblique electric field generated around the opening slit and the distortion of an electric field generated by the dielectric protrusion is provided, the liquid crystal molecules spaced from the alignment control structure can be also satisfactorily controlled, so that the construction is advantageous for enhancing a response speed and an aperture ratio.

The exemplary embodiments also provide a liquid crystal display device in which a liquid crystal layer having an initial state of vertical alignment is interposed between a pair of substrates having electrodes on opposing surfaces thereof, in a dot area constituting one unit of display, a first dielectric protrusion protruded toward the liquid crystal layer being formed on the electrode of one substrate of the pair of substrates and a second dielectric protrusion provided at a position adjacent to the first dielectric protrusion as seen two-dimensionally on the electrode of the other substrate of the pair of substrates, and when the dielectric constant of the first dielectric protrusion is $\epsilon_{r1}$, the dielectric constant of the second dielectric protrusion is $\epsilon_{r2}$, the dielectric constant of a major axis direction of liquid crystal molecules constituting the liquid crystal layer is $\epsilon_{//}$, and the dielectric constant of a minor axis direction thereof is $\epsilon_{\perp}$, the expressions $\epsilon_{r1}>\epsilon_{//}$ and $\epsilon_{r2}>\epsilon_{//}$ are satisfied. The dielectric protrusions provided in the dot area and forming the alignment control structure may be made of the same material, but the alignment control may be performed using the dielectric protrusions having different dielectric constants. When the dielectric protrusions having different dielectric constants are provided adjacent to each other, the dielectric protrusions may be provided on different substrates as described in the above exemplary embodiments. According to the above exemplary embodiments, it is possible to obtain a display with a high image quality and a wide viewing angle.

In the liquid crystal display device according to the exemplary embodiments, a reflective display area for performing reflective display and a transmissive display area for performing transmissive display may be provided in the dot area. According to exemplary embodiments, it is possible to provide a transflective liquid crystal display device capable of performing transmissive display and reflective display with a wide viewing angle and a high image quality.

The exemplary embodiments of the present invention also provide an electronic apparatus including the liquid crystal display device described above. According to the exemplary embodiments, an electronic apparatus including a display unit having a wide viewing angle and a high brightness is provided.

BRIEF DESCRIPTION OF THE DRAWINGS

FIGS. 11A-11D are schematics exemplifying a liquid crystal display device in an exemplary embodiment;

DETAILED DESCRIPTION OF EMBODIMENTS

Figure 1:
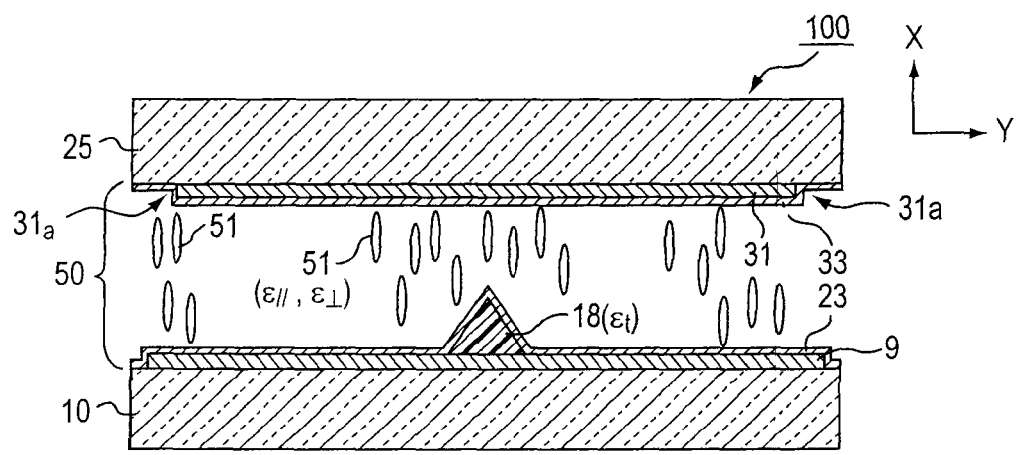
FIG. 1 is a cross-sectional schematic illustrating a basic structure of a liquid crystal display device according to an exemplary embodiment.
Figure 2:
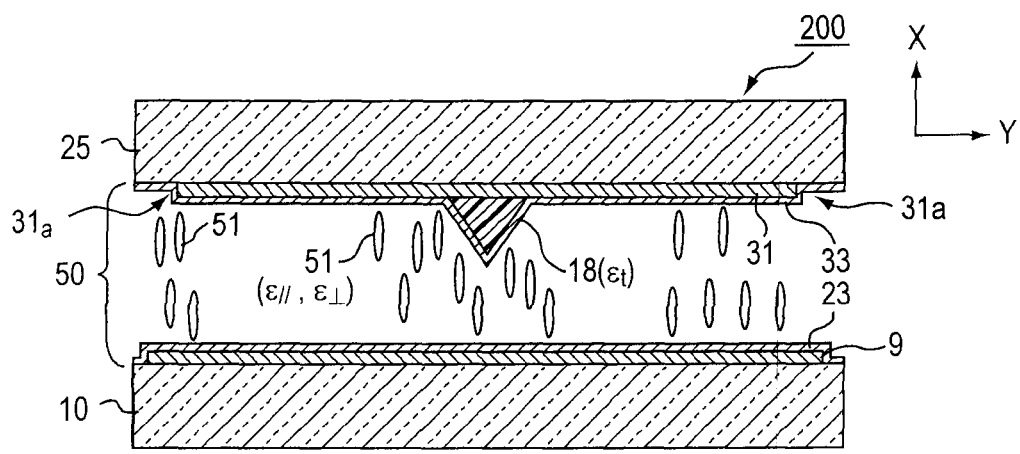
FIG. 2 is a cross-sectional schematic illustrating a basic structure of the liquid crystal display device according to an exemplary embodiment.

Hereinafter, the exemplary embodiments will be described with reference to the drawings. In the drawings referred to below, sizes and thicknesses of respective elements are properly different for the purpose of easily understanding the drawings. FIGS. 1 and 2 are cross-sectional views illustrating a main part (a part of a basic structure) of a liquid crystal display device according to first and second exemplary embodiments, respectively.

The liquid crystal display device 100 according to the first exemplary embodiment shown in FIG. 1 has a structure in which a liquid crystal layer 50 made of liquid crystal having a negative dielectric anisotropy is interposed between a first substrate 25 and a second substrate 10 disposed to be opposite to each other. A second electrode 9, a dielectric protrusion 18, and a vertical alignment film 23 covering the second electrode 9 and the dielectric protrusion 18 are formed in this order at the inner surface side of the second substrate 10. A first electrode 31 and a vertical alignment film 33 are formed in this order at the inner surface side of the first substrate 25. In a dot area constituting one unit of display, the first electrode 31 is formed narrower than the second electrode 9, and edge portions (notched portion) 31a and 31a of the first electrode 31 in the left-right direction of the figure (Y direction, that is, a plane direction of the first substrate 25) are two-dimensionally disposed above the second electrode 9. That is, in one dot area, there is provided a positional relation that the dielectric protrusion 18 is disposed between the edge portion 31a and the edge portion 31a of the first electrode 31 formed on the other substrate (a positional relation that the dielectric protrusion 18 and the edge portions 31a and 31a of the first electrode 31 are disposed to be discretely adjacent to each other without two-dimensionally overlapping each other).

On the other hand, the liquid crystal display device 200 according to the second exemplary embodiment shown in FIG. 2 has the same basic structure as the liquid crystal display device according to the first exemplary embodiment but is different from the liquid crystal display device according to the first exemplary embodiment in that the dielectric protrusion 18 is provided on the first electrode 31 of the first substrate 25. That is, in one dot area, there is provided a positional relation that the dielectric protrusion 18 is disposed between the edge portion 31a and the edge portion 31a of the first electrode 31 formed on the same substrate (a positional relation that the dielectric protrusion 18 and the edge portions 31a and 31a of the first electrode 31 are alternately disposed to be adjacent to each other).

Here, one dot area indicates an area constituting one unit of display, and generally includes one pixel electrode formed on one substrate and a counter electrode formed on the other substrate to be opposite to the pixel electrode.

According to the above structure, in the liquid crystal display devices 100 and 200, in a state (non-selection state, initial alignment state) where a voltage is not applied to both electrodes 9 and 31, liquid crystal molecules 51 constituting the liquid crystal layer 50 are aligned in a vertical direction to the substrates 10 and 25 due to the alignment control power of the vertical alignment films 23 and 33. When a voltage is applied to both electrodes (when it is switched to a selection state), the liquid crystal molecules fall down toward the plane direction of the substrates 10 and 25.

The liquid crystal display devices 100 and 200 have a dielectric protrusion 18 as the alignment control structure for controlling the alignment direction of the liquid crystal molecules 51 at the time of applying a voltage. In addition, the alignment of the liquid crystal molecules 51 can be also controlled by way of distortion of electric field generated at the edge portions (notched portions) 31a of the electrode formed narrower than the electrode provided on the opposite substrate. In the liquid crystal display device according to the first exemplary embodiment and the second exemplary embodiment, the dielectric constant $\epsilon_{t1}$ of the dielectric protrusion 18 provided approximately at the center of one dot area has different relations with the respective dielectric constants $\epsilon_{//}$ and $\epsilon_{\perp}$ of the liquid crystal molecules 51, and on the basis of the different relations, the arrangement relation between the dielectric protrusion 18 and the alignment control structure (the edge portions 31a, 31a) adjacent to the dielectric protrusion is varied. Here, the dielectric constant $\epsilon_{//}$ of the liquid crystal molecules indicates a dielectric constant in the major axis direction (X direction in the figure) of the liquid crystal molecules, and the dielectric constant $\epsilon_{\perp}$ indicates a dielectric constant in the minor axis direction (Y direction in the figure) of the liquid crystal molecules. Hereinafter, $\epsilon_{//}$ and $\epsilon_{\perp}$ are referred to as the major-axis dielectric constant and the minor-axis dielectric constant, respectively.

First, in the liquid crystal display device 100 according to the first exemplary embodiment shown in FIG. 1, the dielectric constant $\epsilon_{t1}$ of the dielectric protrusion 18 provided as the alignment control device of the liquid crystal is set to be smaller than the major-axis dielectric constant $\epsilon_{//}$ of the liquid crystal molecules 51. That is, the dielectric constant $\epsilon_{t1}$ of the dielectric protrusion 18 and the dielectric constants $\epsilon_{//}$ and $\epsilon_{\perp}$ of the liquid crystal molecules 51 satisfy a relation $\epsilon_{\perp} > \epsilon_{//} > \epsilon_{t1}$. On the contrary, in the liquid crystal display device 200 according to the second exemplary embodiment shown in FIG. 2, the dielectric constant $\epsilon_{t1}$ of the dielectric protrusion 18 is set to be greater than the major-axis dielectric constant $\epsilon_{//}$ of the liquid crystal molecules 51 ($\epsilon_{t1} > \epsilon_{//}$).

In both liquid crystal display devices, the arrangements of the dielectric protrusion 18 are different from each other. In this way, in the liquid crystal display device according to the exemplary embodiments, the arrangement relation between the dielectric protrusion 18 and the alignment control structure (the edge portion 31a of the electrode) adjacent to the dielectric protrusion 18 is properly set in accordance with the relation between the dielectric constant of the dielectric protrusion 18 and the dielectric constant of the liquid crystal molecules 51, thereby obtaining a satisfactory display with a high image quality and a wide viewing angle.

Referring to FIGS. 3 to 10, movement of the liquid crystal molecules and operation of the liquid crystal display device according to the present exemplary embodiment will be described in accordance with the relation between the dielectric constant $\epsilon_{t1}$ of the dielectric protrusion 18 and the dielectric constant $\epsilon_{//}$, and $\epsilon_{\perp}$ of the liquid crystal molecules 51. FIGS. 3 to 10 are cross-sectional views illustrating a result of simulation calculating movement of the liquid crystal molecules when the dielectric constant of the dielectric protrusion 18 is varied.

Figure 3:
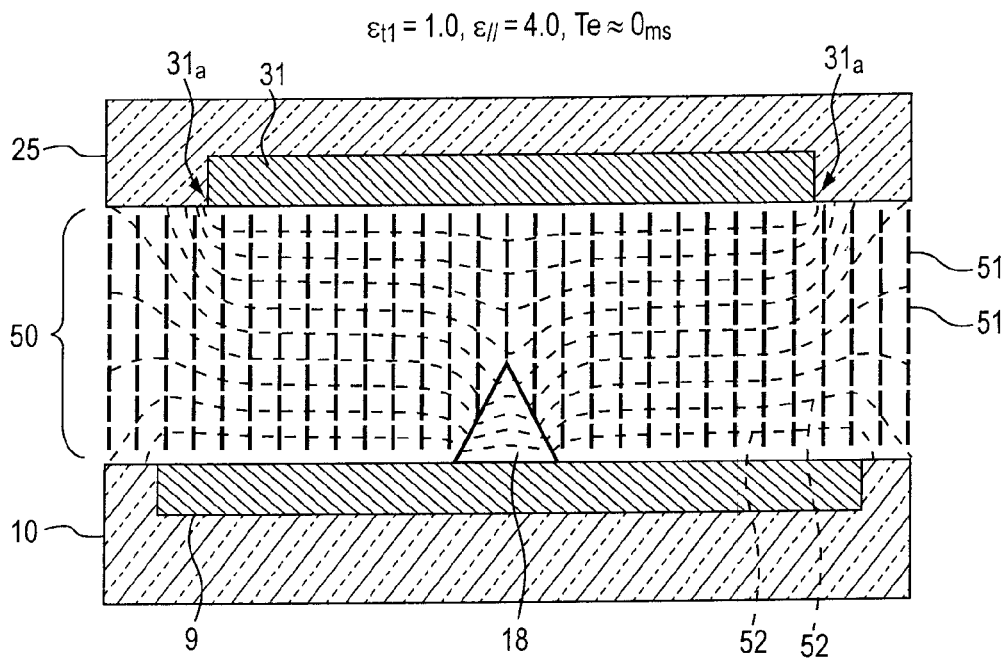
FIG. 3 is a schematic illustrating a result of simulation according to an exemplary embodiment.
Figure 4:
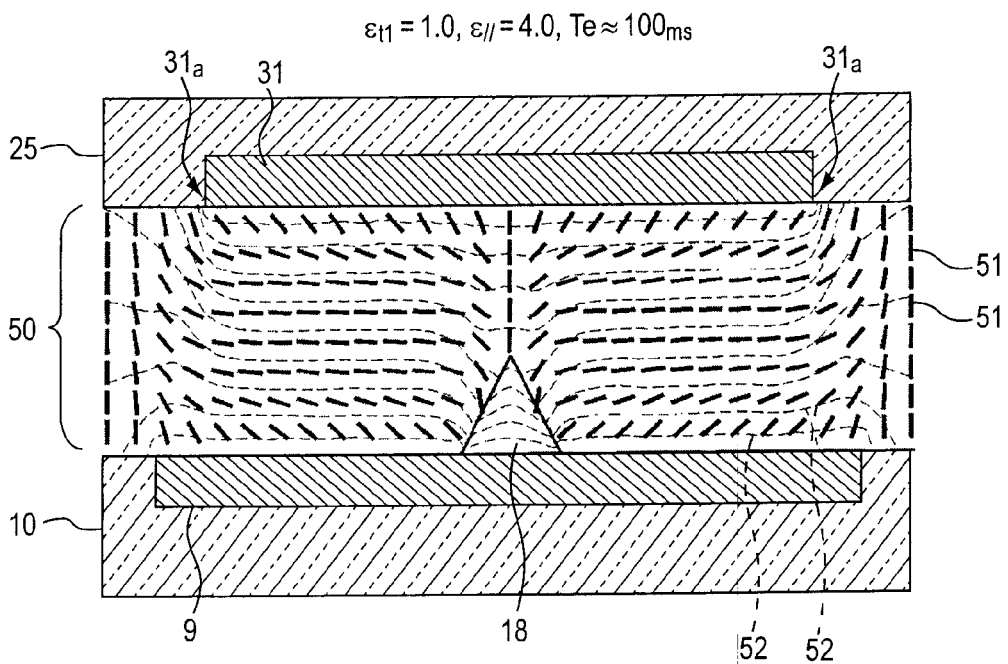
FIG. 4 is a schematic illustrating a result of simulation according to an exemplary embodiment.

In the liquid crystal display device showing a main part (a part of a basic structure) in one dot area in which the dielectric constant $\epsilon_{t1}$ of the dielectric protrusion is 1.0, the major-axis dielectric constant $\epsilon_{//}$ of the liquid crystal molecules is 4.0, and the minor-axis dielectric constant $\epsilon_{\perp}$ is 9.0, a liquid crystal state (FIG. 3) right after application of voltage between both electrodes 9 and 31 and a liquid crystal state (FIG. 4) after 100 ms passes are shown in FIGS. 3 and 4.

In the simulations of which the results are illustrated in FIGS. 3 to 8, as a structure of the electrode and the dielectric protrusion, the dielectric protrusion 18 is provided approximately at the center on the electrode 9 of the second substrate 10, the first electrode 31 is formed narrower than the second electrode 9, and the edge portions 31a and 31a of the first electrode 31 are disposed above the second electrode 9.

Figure 5:
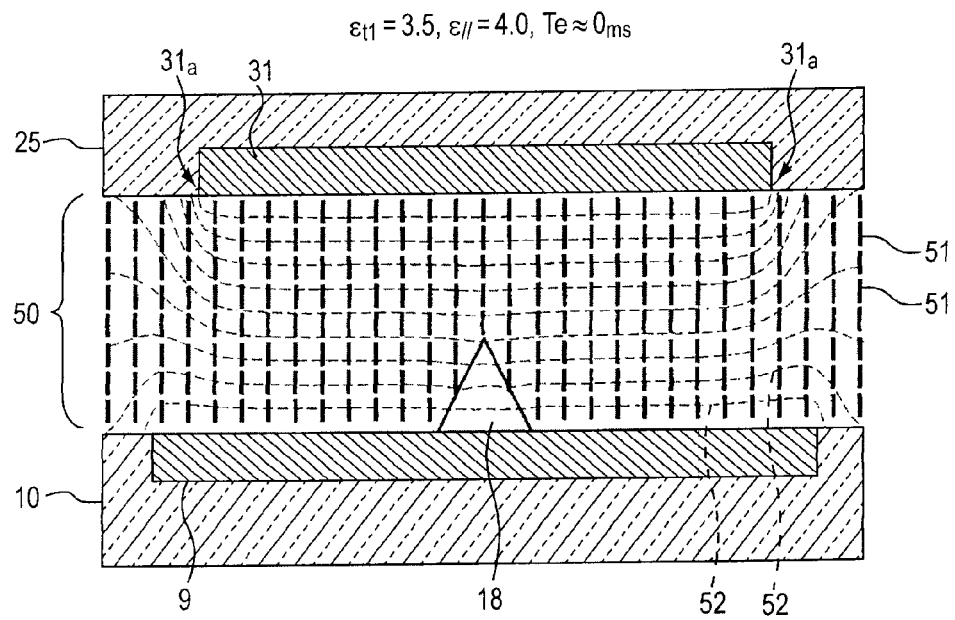
FIG. 5 is a schematic illustrating a result of simulation according to an exemplary embodiment.
Figure 6:
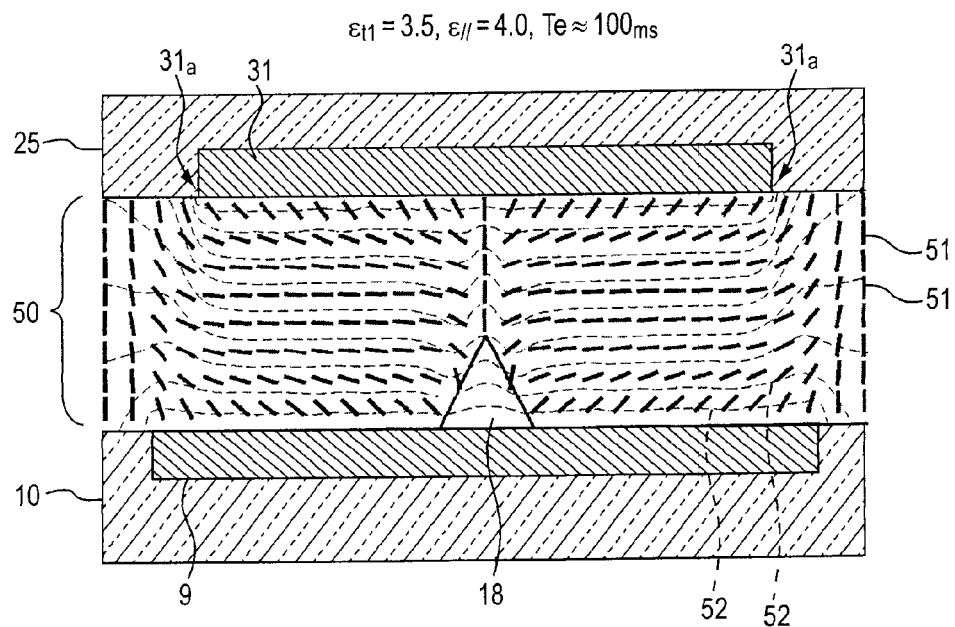
FIG. 6 is a schematic illustrating a result of simulation according to an exemplary embodiment.

In the liquid crystal display device showing a main part (a part of a basic structure) in one dot area in which the dielectric constant $\epsilon_{t1}$ of the dielectric protrusion is 3.5, the major-axis dielectric constant $\epsilon_{//}$ of the liquid crystal molecules is 4.0, and the minor-axis dielectric constant $\epsilon_{\perp}$ is 9.0, a liquid crystal state (FIG. 5) right after application of voltage between both electrodes 9 and 31 and a liquid crystal state (FIG. 6) after 100 ms passes are shown in FIGS. 5 and 6.

Figure 7:
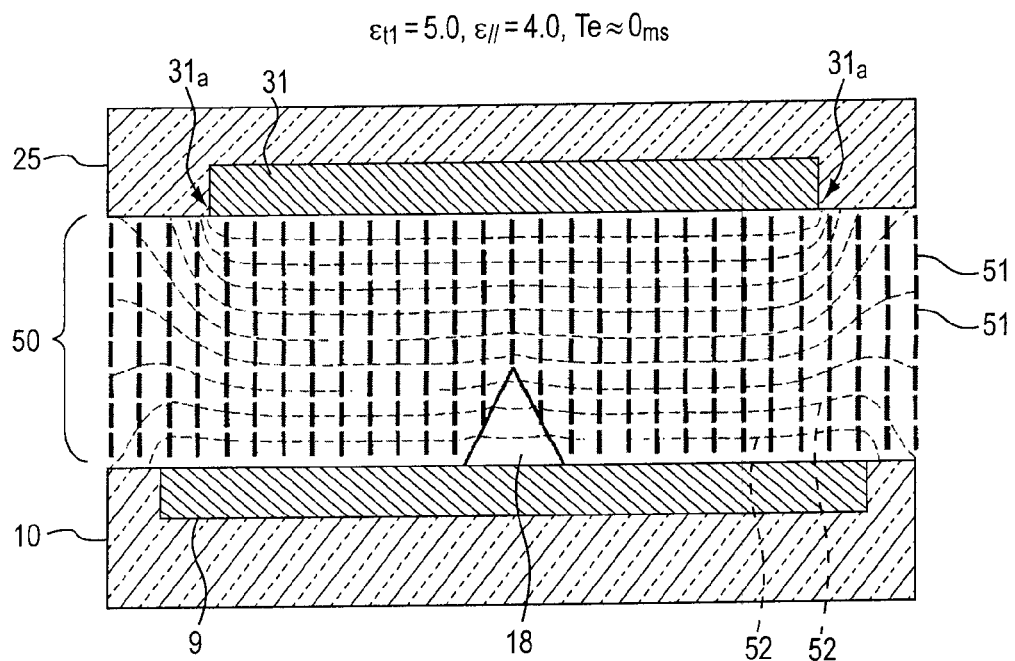
FIG. 7 is a schematic illustrating a result of simulation according to an exemplary embodiment.
Figure 8:
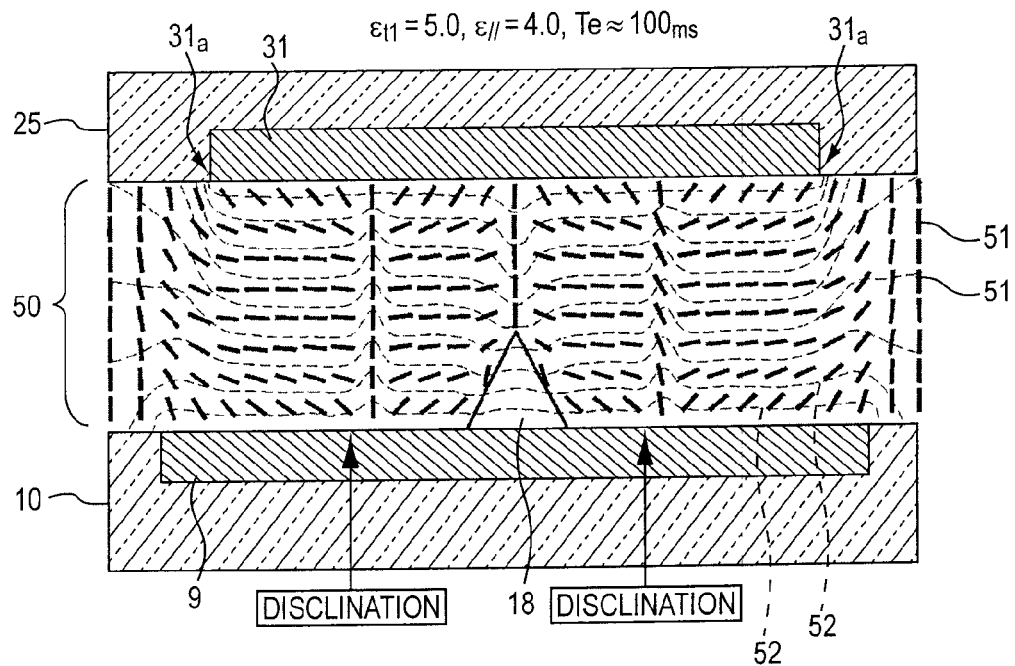
FIG. 8 is a schematic illustrating a result of simulation according to an exemplary embodiment.

In the liquid crystal display device showing a main part (a part of a basic structure) in one dot area in which the dielectric constant $\epsilon_{t1}$ of the dielectric protrusion is 5.0, the major-axis dielectric constant $\epsilon_{//}$ of the liquid crystal molecules is 4.0, and the minor-axis dielectric constant $\epsilon_{\perp}$ is 9.0, a liquid crystal state (FIG. 7) right after application of voltage between both electrodes 9 and 31 and a liquid crystal state (FIG. 8) after 100 ms passes are shown in FIGS. 7 and 8.

As shown in the figures, under the conditions shown in FIGS. 3 and 6 in which the dielectric protrusion 18 and the liquid crystal molecules 51 satisfy a relation $\epsilon_{t1} < \epsilon_{//}$, the liquid crystal molecules 51 fall down toward both sides (toward the edges of the electrode) from the dielectric protrusion 18, and two liquid crystal domains are formed symmetrically about the dielectric protrusion 18. Now, the alignment control functions of the edge portions 31a and the dielectric protrusion 18 will be described.

When no device for controlling the alignment of the liquid crystal molecules exists, the liquid crystal molecules fall down in a random direction with application of a voltage. In this case, a discontinuous line (disclination) appears in a boundary with a liquid crystal domain having a different alignment state, thereby causing a remaining image or decrease in brightness. Since the disclination appears at different positions depending upon application of a voltage, the size of the liquid crystal domain in the dot area is not stable, and since the liquid crystal domains have different viewing angle characteristics, the disclination appears like a spot shape as seen in a tilted direction. Therefore, by providing the alignment control device of the liquid crystal molecules, it is possible to bring down the liquid crystal molecules in a predetermined direction at the time of applying a voltage.

First, the function of the dielectric protrusion 18 will be described with reference to FIGS. 3 and 4. Since an alignment film 23 is formed on the surface of the second electrode 9 including the dielectric protrusion 18 (as shown in FIGS. 1 and 2), the liquid crystal molecules 51 are aligned vertical to the substrate plane at the time of no application of a voltage and right after the application of a voltage is stopped. Here, when a voltage is applied to the first electrode 31 and the second electrode 9, an electric field expressed by the equi-potential lines 52, is formed in the liquid crystal layer 50, and specifically, around the dielectric protrusion 18, distortion of the electric field is generated due to the difference in dielectric constant between the dielectric protrusion 18 and the liquid crystal molecules 51. When the distortion is generated, the liquid crystal molecules 51 aligned vertical to the substrate plane are pre-tilted by a predetermined angle about the electric field. Therefore, the liquid crystal molecules 51 can be brought down toward the lateral outsides (in a direction which the contact angle about the slope surface of the dielectric protrusion 18 is increased) of the dielectric protrusion 18 with application of a voltage, thereby controlling the alignment. The liquid crystal molecules in the periphery of the dielectric protrusion 18 can be also brought down in the same direction in the same way as bringing down dominoes.

Next, the function of the edge portions 31a of the electrode will be described. Since an alignment film 33 is formed to cover the edge portions 31a, the liquid crystal molecules 51 at the time of no application of a voltage are aligned vertical to the substrate plane. Here, when a voltage is applied to the first electrode 31 and the second electrode 9, as indicated by the equi-potential lines 52, an oblique electric field is generated around the edge portions 31a of the electrode. Since the major axis direction of the liquid crystal molecules 51 at the time of no application of a voltage is inclined by a predetermined angle as seen from the oblique electric field, it is similar to the case where a pre-tilt angle is given to the liquid crystal molecules. Therefore, by applying a voltage, the liquid crystal molecules can be brought down toward the center of the electrode from the edge portions 31a, thereby controlling the alignment. The liquid crystal molecules 51 disposed inside the edge portions 31a (at the center side of the electrode) can be sequentially brought down in the same direction in accordance with the alignment direction of the liquid crystal molecules 51 in the edge portions 31a, similar to a domino effect.

Through the above operation, the liquid crystal molecules 51 of which the alignment has been controlled by the dielectric protrusion 18 and the edge portions 31a of the electrode are uniformly brought down in the same direction between the dielectric protrusion 18 and one edge portion 31a, so that the liquid crystal domains, approximately symmetric about the dielectric protrusion 18, are formed as shown in FIGS. 4 and 6. Therefore, in the liquid crystal display device 100 according to the exemplary embodiment shown in FIG. 1, which has the same condition as FIGS. 3 to 6, it can be seen that a satisfactory display with a wide viewing angle and a high brightness can be obtained.

On the contrary, under the condition shown in FIGS. 7 and 8, the dielectric constants of the dielectric protrusion 18 and the liquid crystal molecules 51 satisfy the expression $\epsilon_{t1} > \epsilon_{//}$. As shown in FIG. 8, the liquid crystal molecules 51 fall down in the direction (a direction toward the front tip of the dielectric protrusion 18, that is, a direction in which the contact angle with the slope of the dielectric protrusion 18 is decreased) along the slope of the dielectric protrusion 18 at the time of applying a voltage, and the liquid crystal molecules 51 around the dielectric protrusion 18 fall down toward the dielectric protrusion 18. On the other hand, similarly to the conditions of FIGS. 3 to 6, at the edge portions 31a of the first electrode 31, the liquid crystal molecules 51 are brought down toward the center of the first electrode 31. In this way, the liquid crystal molecules 51 are brought down in the opposite direction between the dielectric protrusion 18 and the edge portions 31a, and as a result, the liquid crystal molecules 51 are not brought down at a middle position between the dielectric protrusion 18 and the edge portions 31a of the first electrode, thereby causing the disclination.

In this way, when the dielectric constant $\epsilon_{t1}$ of the dielectric protrusion 18 is different from the dielectric constant $\epsilon_{//}$ of the liquid crystal molecules 51, the behavior of the liquid crystal molecules 51 at the time of applying a voltage is varied, so that a high-quality display having a wide viewing angle is obtained under the condition of $\epsilon_{t1} < \epsilon_{//}$ shown in FIGS. 3 to 6. However, under the condition of $\epsilon_{t1} > \epsilon_{//}$ shown in FIGS. 7 and 8, the disclination is generated in the dot area, thereby deteriorating the display quality. The difference in behavior of the liquid crystal molecules depending upon the conditions resulting from different shapes of distortion of an electric field generated in the liquid crystal layer 50 due to the difference in dielectric constant between the dielectric protrusion 18 and the liquid crystal. That is, under the condition shown in FIGS. 4 and 6, due to the shape of the equi-potential lines 52, shown in both figures, the electric-field distortion convex upwardly at the upside of the dielectric protrusion 18 in the figures is generated, and under the condition shown in FIG. 8, the electric-field distortion downwardly convex is generated. Accordingly, the falling-down direction of the liquid crystal molecules 51 are varied, so that the liquid crystal domains formed in the liquid crystal layer 50 are varied.

As described above, under the condition ($\epsilon_{t1} > \epsilon_{//}$) shown in FIGS. 7 and 8, a satisfactory display cannot be obtained. Therefore, the inventor of the present invention repeatedly studied the structure of the liquid crystal display device for obtaining a satisfactory display even under the condition shown in FIGS. 7 and 8, and as a result, found out that by the dielectric protrusion 18 at the first substrate 25 side having another alignment control structure (the edge portions 31a of the first electrode 31) as shown in FIG. 2, a satisfactory display can be obtained even when the dielectric protrusion 18 having a dielectric constant higher than the dielectric constant $\epsilon_{//}$ of the liquid crystal molecules.

Figure 9:
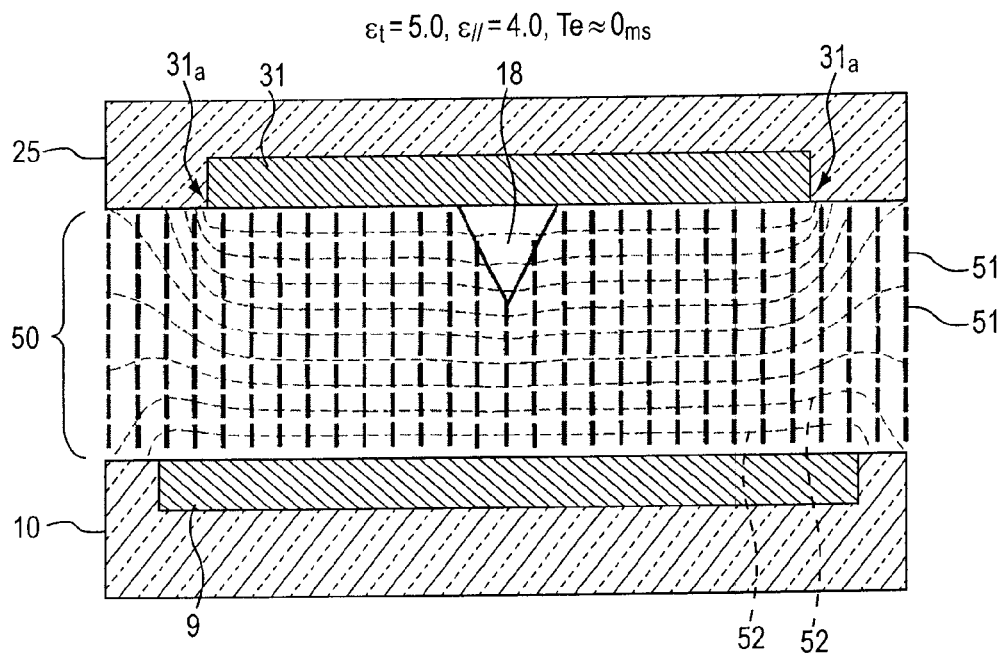
FIG. 9 is a schematic illustrating a result of simulation according to an exemplary embodiment.
Figure 10:
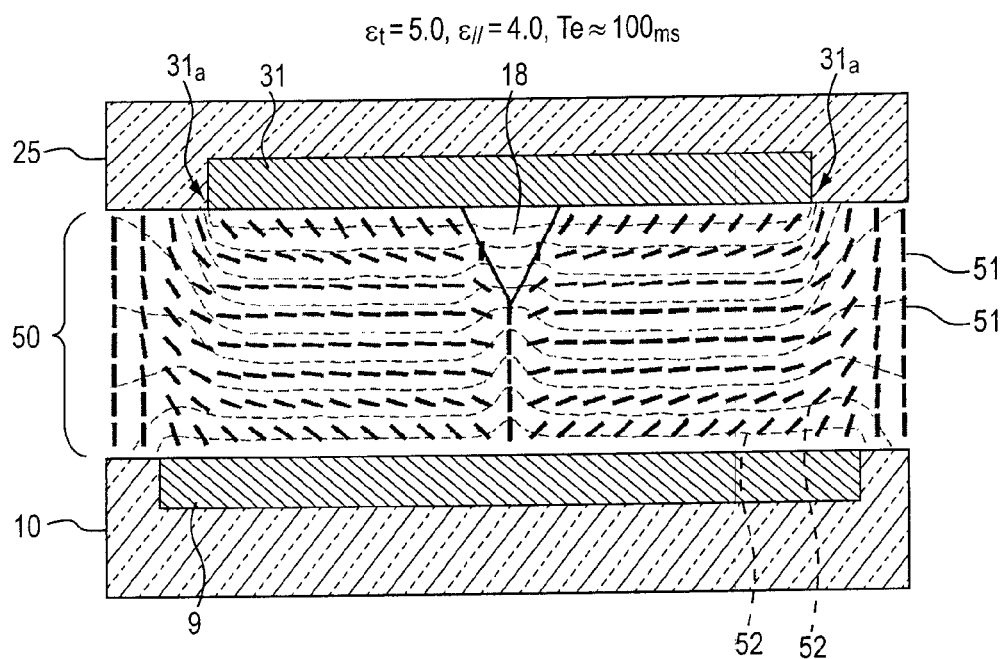
FIG. 10 is a schematic illustrating a result of simulation according to an exemplary embodiment.

FIGS. 9 and 10 show results of simulation in the liquid crystal display device having the same structure as the liquid crystal display device 200 shown in FIG. 2, in which the dielectric protrusion 18 is disposed on the electrode 31 of the first substrate 25. The dielectric constant $\epsilon_{t1}$ of the dielectric protrusion 18 is 5.0, the dielectric constant $\epsilon_{//}$ in the major axis direction of the liquid crystal molecules 51 is 4.0, and the minor-axis dielectric constant $\epsilon_{\perp}$ is 9.0.

As shown in FIG. 10, when the structure shown in FIG. 2 is employed, the liquid crystal domains symmetric about the dielectric protrusion 18 are formed in the liquid crystal layer 50 at the time of applying a voltage, so that it is possible to provide a liquid crystal display device capable of performing a satisfactory display with a wide viewing angle and a high brightness even under the condition of $\epsilon_{t1} > \epsilon_{//}$.

The inventor of the present invention verified the response speed of the liquid crystal display device when the dielectric constant $\epsilon_{r1}$ of the dielectric protrusion 18 is changed. As a result, in the liquid crystal display device having the condition ($\epsilon_{r1}$=1.0) of FIGS. 3 and 4, it was seen that it is possible to accomplish enhancement of the response speed by about 5 ms in the intermediate gray-scale area compared with the liquid crystal display device having the condition ($\epsilon_{r1}$=3.5) of FIGS. 5 and 6. As can be seen from the comparison of the distributions of the equi-potential lines 52, in FIGS. 4 and 6, it is because the distortion of an electric field due to the dielectric protrusion 18 of FIG. 4 is greater, and thus the alignment control ability for the liquid crystal molecules 51 is increased.

Although it has been described in the above exemplary embodiment that the case where the edge portions 31a of the first electrode 31 are used as an example of the alignment control structure adjacent to the dielectric protrusion 18, an opening slit formed by cutting out a part of the first electrode 31 in place of the edge portions 31a of the first electrode 31 may be provided at both sides (portions positioned at both ends of the first electrode 31) of the dielectric protrusion 18, and in this case, the same advantage can be obtained.

In the exemplary embodiments, the alignment control structure adjacent to the dielectric protrusion 18 may be another dielectric protrusion (second dielectric protrusion). However, in this case, it is necessary to pay attention to the dielectric constant of another dielectric protrusion (second dielectric protrusion). That is, as can be clearly seen from the above description, in order to form a dielectric protrusion having the same alignment control function as the edge portion 31a or the opening slit of the first electrode, the dielectric constant ($\epsilon_{r2}$) of the second dielectric protrusion together with the major-axis dielectric constant $\epsilon_{//}$ of the liquid crystal molecules 51 should have the relation $\epsilon_{r2} < \epsilon_{//}$.

On the other hand, the dielectric constant $\epsilon_{r2}$ of the second dielectric protrusion together with the major-axis dielectric constant $\epsilon_{//}$ of the liquid crystal molecules has the relation $\epsilon_{r2} > \epsilon_{//}$, the liquid crystal molecules 51 fall down toward the dielectric protrusion from the periphery. As a result, when the liquid crystal display device having the second dielectric protrusion is embodied, in the structure shown in FIG. 1, the second dielectric protrusions instead of the edge portions 31a of the first electrode are provided at both sides with the dielectric protrusion 18 therebetween at the same side (on the electrode 9 of the second substrate) as the dielectric protrusion 18, and in the structure shown in FIG. 2, the second dielectric protrusions instead of the edge portions 31a of the first electrode are provided at the opposite ends of the dielectric protrusion 18 (on the electrode 9 of the second substrate). When this structure is employed, it is also possible to obtain a satisfactory display with a wide viewing angle and a high brightness in the liquid crystal display device in which the second dielectric protrusions having the dielectric constant $\epsilon_{r2}$ higher than the major-axis dielectric constant $\epsilon_{//}$ of the liquid crystal molecules are provided as the alignment control structure adjacent to the dielectric protrusion 18.

Specific Structural Example of Liquid Crystal Display Device

The construction described in the above exemplary embodiment may be also applied to the liquid crystal display device including a liquid crystal having a negative dielectric anisotropy. FIGS. 11A-11D schematically illustrate various types of liquid crystal display devices. FIG. 11A shows a transmissive liquid crystal display device, FIG. 11B shows a reflective liquid crystal display device, and FIGS. 11C and 11D show a transflective liquid crystal display device. In addition, FIG. 11C shows a case where the first substrate is used as the element substrate and the second substrate is used as the counter substrate, and FIG. 11D shows a case where the second substrate is used as the element substrate and the first substrate is used as the counter substrate. In the liquid crystal display devices shown in FIGS. 11A-11D, it is possible to obtain the aforementioned advantages by forming the dielectric protrusions and the opening slits on the surface of a transparent electrode. Therefore, in the embodiment to be described later, the transmissive liquid crystal display device shown in FIG. 11A is described as a first structural example. As a second structural example, the transflective liquid crystal display device shown in FIG. 11C is described.

First Structural Example

Figure 12:
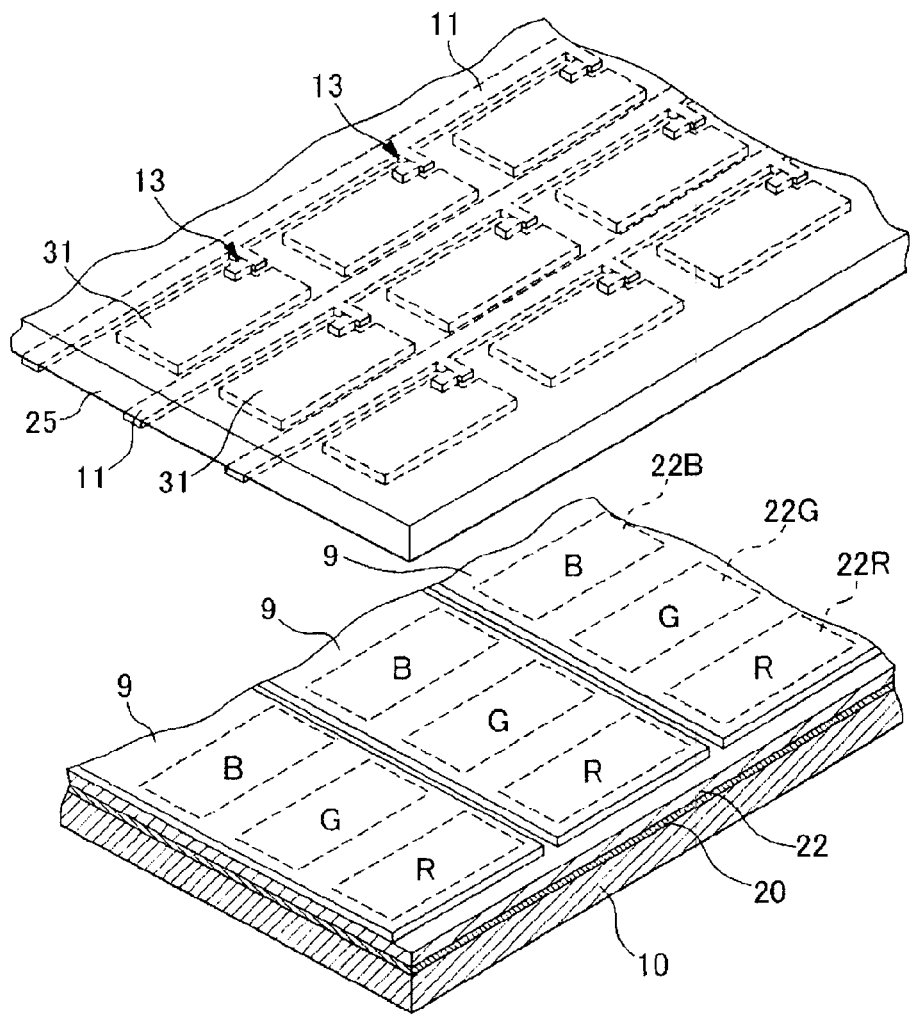
FIG. 12 is a perspective schematic illustrating a liquid crystal display device according to a structural example in an exemplary embodiment.
Figure 13:
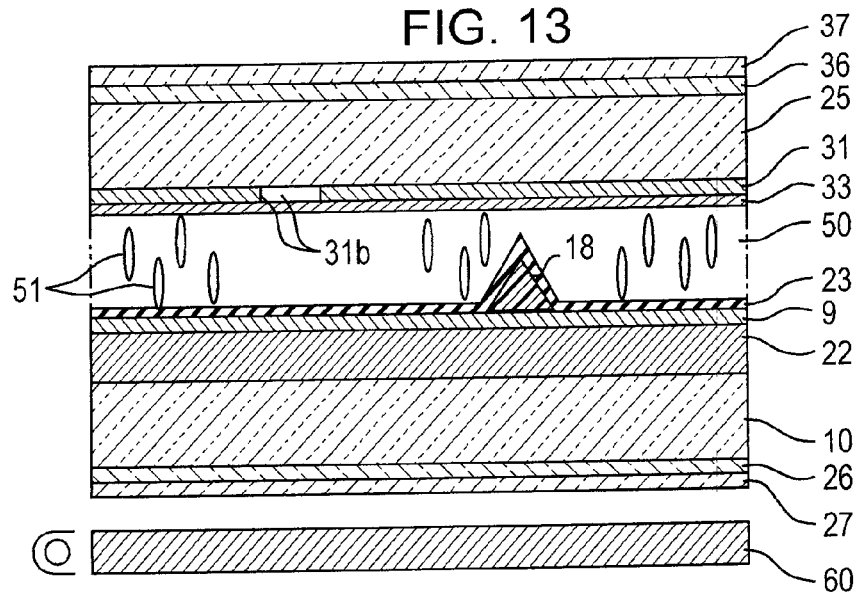
FIG. 13 is cross-sectional schematic illustrating a liquid crystal display device according to a first structural example in an exemplary embodiment.
Figure 14:
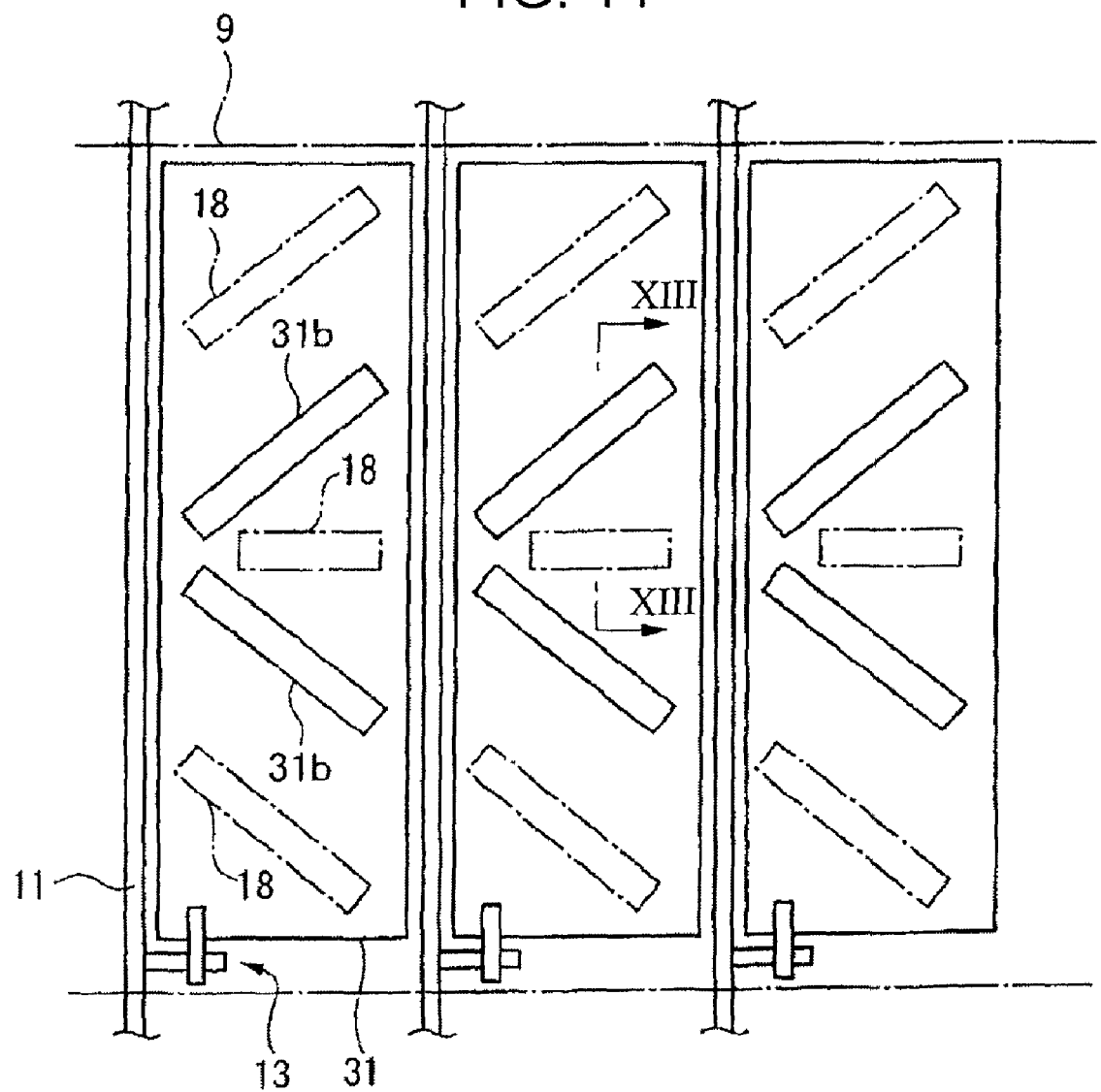
FIG. 14 is a plan schematic illustrating one pixel area of the liquid crystal display device according to the first structural example in an exemplary embodiment.

FIG. 12 is a partial perspective view illustrating a specific structural example of the liquid crystal display device according to the aforementioned exemplary embodiment, FIG. 13 is a partial cross-sectional view illustrating one dot area of the liquid crystal display device, and FIG. 14 is a plan view illustrating one pixel area comprising three dot areas of the liquid crystal display device. The liquid crystal display device shown in the figures is an active-matrix color liquid crystal display device employing a TFD (Thin Film Diode) element (two-terminal nonlinear element) as a switching element. However, the present exemplary embodiment may be also applied to an active-matrix liquid crystal display device employing a TFT (Thin Film Transistor) as the switching element. The partial cross-section structure shown in FIG. 13 corresponds to the cross-sectional structure taken along Line XIII-XIII shown in FIG. 14.

As shown in FIG. 12, the liquid crystal display device according to the present example includes an element substrate (first substrate) 25 and a counter substrate (second substrate) 10 opposite to each other as major elements, and a liquid crystal layer not shown is interposed between both substrates 10 and 25. As conceptually shown in FIG. 13, the liquid crystal layer includes a liquid crystal having a negative dielectric anisotropy indicating an initial alignment of vertical alignment. The element substrate 25 is a substrate made of a light-transmitting material such as glass, plastic, quartz, etc., and a plurality of data lines 11 extending in a direction intersecting scanning lines (serving as the counter electrode 9) of the counter substrate 10 are provided in a stripe shape inside the inner surface (at the lower side in the figure). A plurality of pixel electrodes (first electrode) 31 having an approximately rectangular shape as seen two-dimensionally and made of a transparent conductive material such as ITO (Indium Tin Oxide) are arranged in a matrix shape, and are connected to the data lines 11 through the TFD elements 13 provided correspondingly to the respective pixel electrodes.

On the other hand, the counter substrate 10 is a substrate made of a light-transmitting material such as glass, plastic, quartz, etc., and a color filter layer 22 and a plurality of scanning lines 9 are formed inside the inner surface (the upper side in the figure). As shown in FIG. 12, in the color filter layer 22, approximately rectangular color filters 22R, 22G, and 22B are periodically arranged as seen two-dimensionally. The respective color filters 22R, 22G, and 22B are formed correspondingly to the pixel electrodes 31 of the element substrate 25. The scanning lines 9 are formed in a belt shape out of a transparent conductive material such as ITO and extend in the direction intersecting the data lines 11 of the element substrate 25. The scanning lines 9 are formed to cover the color filters 22R, 22G, and 22B arranged in the extension direction thereof, and serve as the counter electrode (first electrode). The formation area of the pixel electrode 31 constitutes one dot and three dots including the color filters 22R, 22G, and 22B constitute one pixel.

Exemplary Cross-Sectional Structure

Next, FIG. 13 is a partial cross-sectional view illustrating one dot area of FIG. 12. In FIG. 13, for the purpose of easy understanding, the TFD elements and various lines on the element substrate 25 are omitted.

As shown in FIG. 13, at the liquid crystal layer side of the pixel electrode 31 in the element substrate 25, a vertical alignment film 33 made of polyimide, etc. is formed. On the other hand, at the liquid crystal layer side of the counter electrode 9 in the counter substrate 10, a vertical alignment film 23 made of polyimide, etc. is formed. In addition, the alignment films 23 and 33 have been subjected to the vertical alignment process, but have not been subjected to the process of giving a pre-tilt such as a rubbing.

A liquid crystal layer 50 made of a liquid crystal material having a negative dielectric anisotropy is interposed between the element substrate 25 and the counter substrate 10. As conceptually shown by the liquid crystal molecules 51, the liquid crystal material is aligned vertical to the alignment film at the time of no application of a voltage, and the liquid crystal material is aligned parallel (that is, vertical to the electric field direction) to the alignment film at the time of applying a voltage. The element substrate 25 and the counter substrate 10 are bonded to each other through a seal member (not shown) coated at the circumferential edge portions of the element substrate 25 and the counter substrate 10, and the liquid crystal layer 50 is sealed in the space formed by the element substrate 25, the counter substrate 10, and the seal member.

On the other hand, a retardation film 36 and a polarizing film 37 are provided on the outer surface of the element substrate 25, and a retardation film 26 and a polarizing film 27 are provided on the outer surface of the counter substrate 10. The polarizing films 27 and 37 have a function of transmitting only the linearly-polarized light which is vibrating in a specific direction. As the retardation films 26 and 36, λ/4 wave plates having a phase difference of a ¼ wavelength for the wavelength of visible ray are employed. The transmission axes of the polarizing films 27 and 37 and the phase-lag axes of the retardation films 26 and 36 form about 45°, and a circular polarizing film is constituted by the polarizing films 27 and 37 and the retardation films 26 and 36. The linearly-polarized light can be converted into circularly-polarized light and the circularly-polarized light can be converted into the linearly-polarized light using the circularly-polarized light. The transmissive axis of the polarizing film 27 and the transmissive axis of the polarizing film 37 are perpendicular to each other and the phase-lag axis of the retardation film 26 and the phase-lag axis of the retardation film 36 are perpendicular to each other. At the outside of the liquid crystal cell contacting the outer surface of the counter substrate 10, a backlight (lighting device) 60 having a light source, a reflector, a light-guiding plate, etc. is provided.

In the liquid crystal display device according to the present exemplary embodiment shown in FIG. 13, the image display is performed as follows. The light applied from the backlight 60 is converted into circularly-polarized light through the polarizing film 27 and the retardation film 26, and then enters the liquid crystal layer 50. Since the liquid crystal molecules do not have a refractive anisotropy, the entry light passes through the liquid crystal layer 50 with circular polarization. The entry light passing through the retardation film 36 is converted into the linearly-polarized light perpendicular to the transmissive axis of the polarizing film 37. Then, since the linearly-polarized light does not pass through the polarizing plate 27, in the liquid crystal display device according to the present exemplary embodiment, the black display is performed at the time of no application of a voltage (normally black mode).

On the other hand, when an electric field is applied to the liquid crystal layer 50, the liquid crystal molecules are re-aligned in parallel to the substrate and have a refractive anisotropy. Accordingly, the circularly-polarized light entering the liquid crystal layer 50 from the backlight 60 is converted into elliptically-polarized light in the course of passing through the liquid crystal layer 50. Although the entry light passes through the retardation film 36, the entry light is not converted into the linearly-polarized light perpendicular to the transmissive axis of the polarizing film 37, and all or a part thereof passes through the polarizing film 37. Therefore, in the liquid crystal display device according to the present exemplary embodiment, the white display is performed at the time of applying a voltage. In addition, by adjusting the voltage applied to the liquid crystal layer 50, the gray-scale display may be performed.

Exemplary Alignment Control Device

FIG. 14 is a plan view illustrating one pixel area including three dot areas in the liquid crystal display device shown in FIG. 12. Here, the constituent members of element substrate are indicated by solid lines and the constituent members of the counter substrate are indicated by dot-dashed lines. As shown in FIG. 14, the opening slit 31b or the dielectric protrusion 18, which is the alignment control device of the liquid crystal molecules, is formed on the surface of the pixel electrode 31 and the counter electrode 9. A plurality of opening slits 31b having approximately a belt shape as seen two-dimensionally is formed in the pixel electrode 31. A plurality of dielectric protrusions 18 having approximately a belt shape as seen two-dimensionally is formed on the surface of the counter electrode 9. The dielectric protrusions 18 formed in the counter substrate 10 and the opening slits 31b formed in the element substrate 25 are disposed to be alternate (to depart from each other without two-dimensionally overlapping each other) in the longitudinal direction of the pixel electrode 31. The protrusions 18 and the slits 31b are disposed such that the pitch of the protrusions 18 and the pitch of the slits 31b are enlarged from one longitudinal side to the other longitudinal side in the pixel electrode 31. To the contrary, the opening slits may be formed in the counter electrode 10 and the dielectric protrusions may be formed on the pixel electrode.

The dielectric protrusions 18 are made of a dielectric material such as resin and are formed using a photolithography method, etc. employing a gray mask. In the liquid crystal display device according to the present example, a plurality of dielectric protrusions 18 and the alignment control structures (opening slits) are employed in the structure of the liquid crystal display device 100 shown in FIG. 1, so that the dielectric constant $\epsilon_{r1}$ of the dielectric protrusions 18 is set to be smaller than the major-axis dielectric constant $\epsilon_{//}$ of the liquid crystal molecules 51. That is, since the liquid crystal display device according to the present example employs the basic structure and function of the liquid crystal display device shown in FIG. 1 and the arrangement of the dielectric protrusions 18 and the opening slits 31b is suitably determined in accordance with the dielectric constant relation between the dielectric protrusions 18 and the liquid crystal layer 50, it is possible to obtain a satisfactory display with a high contrast without generating the disclination in the dot area.

In the liquid crystal display device according to the present example, as seen two-dimensionally, the liquid crystal molecules fall down radially about the opening slits 31b of a belt shape at the time of applying an electric field. In addition, the liquid crystal molecules 51 fall down about the dielectric protrusions 18. Due to operation of the dielectric protrusions 18 and the opening slits 31a, the liquid crystal molecules are aligned in a predetermined direction between the dielectric protrusions 18 and the opening slits 31b shown in FIG. 14, thereby suitably controlling the alignment of the liquid crystal layer 50 in the dot area.

Although it has been described in the present example that the opening slits 31b as the alignment control structures adjacent to the dielectric protrusions 18 are formed in the electrode provided in the dot area, other dielectric protrusions having a relation $\epsilon_{//} > \epsilon_{t2}$ with the dielectric constant $\epsilon_{t2}$ may be provided by forming other dielectric protrusions inside the opening slits. Accordingly, since there is provided an alignment control structure for performing the alignment control of the liquid crystal molecules using the oblique electric field generated around the opening slits and the distortion of an electric field generated by the dielectric protrusions, the liquid crystal molecules spaced from the alignment control structure can be satisfactorily controlled, so that it is advantageous for enhancing the response speed and the aperture ratio.

Although it has been described in the present example that the dielectric protrusions 18 are formed on the counter electrode 9, slits may be formed by cutting out the counter electrode 9 into two-dimensional shapes corresponding to the dielectric protrusions 18 and the dielectric protrusions 18 may be provided inside the slits. That is, at least a part of the counter electrode 9 serving as a base of the portions formed with the dielectric protrusions 18 may be cut out (opened). Accordingly, the distortion of an electric field generated around the dielectric protrusions 18 can be enhanced at the time of applying a voltage and thus larger alignment control ability can be obtained, so that it is possible to enhance the response speed of the liquid crystal display device.

Second Structural Example

Figure 15:
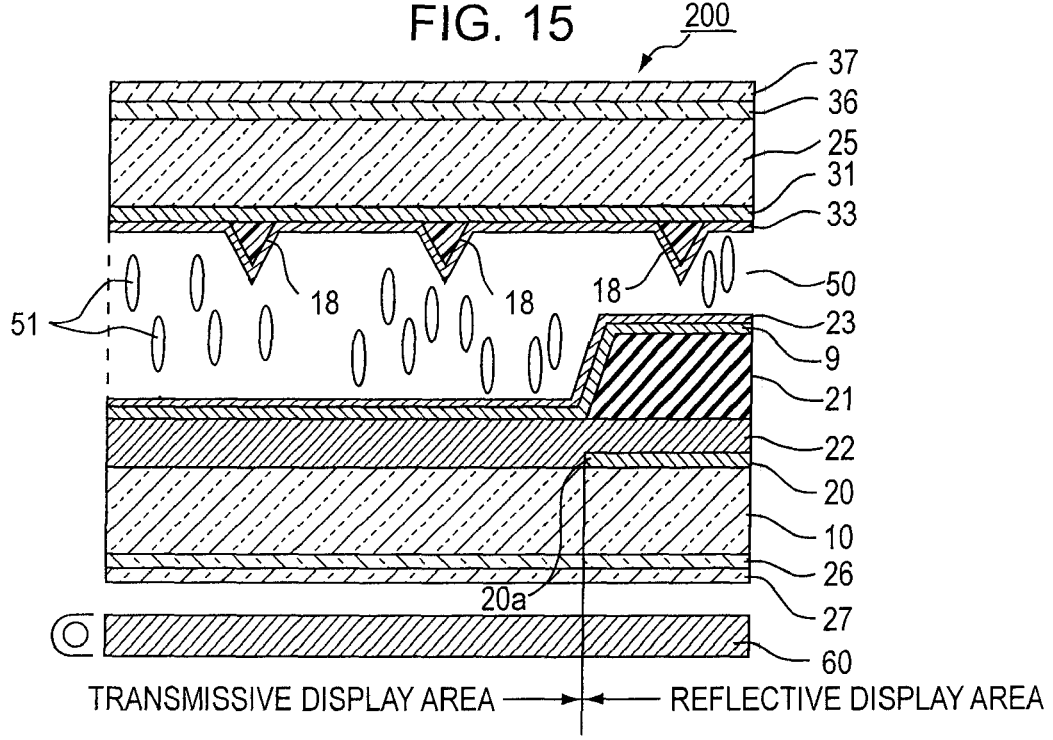
FIG. 15 is a cross-sectional schematic illustrating a liquid crystal display device according to a second structural example in an exemplary embodiment.
Figure 16:
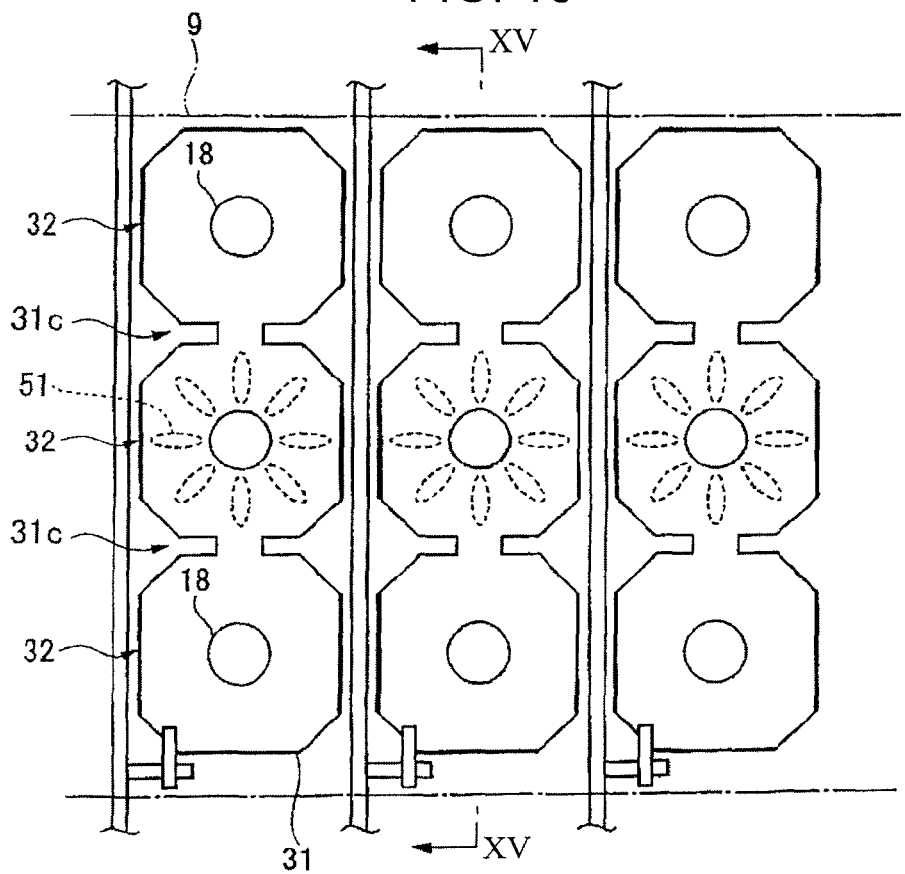
FIG. 16 is a plan schematic illustrating one pixel area of the liquid crystal display device according to the second structural example in an exemplary embodiment.

Next, a second structural example of the liquid crystal display device according to the exemplary embodiments will be described. FIG. 15 is a cross-sectional view taken along a longitudinal direction (longitudinal side) of one dot area of the liquid crystal display device of the present structural example, and FIG. 16 is a plan view illustrating one pixel area including three dot areas in the liquid crystal display device. The liquid crystal display device of the present structural example is a transflective liquid crystal display device. The elements similar to the first exemplary embodiment will be not described. The cross-sectional structure shown in FIG. 15 corresponds to the cross-sectional structure taken along Line XV-XV of FIG. 16.

As shown in FIG. 15, in the liquid crystal display device of the second structural example, a reflective film 20 made of a metal film having a high reflectance, such as aluminum or silver, etc. is formed at the inside of the second substrate (counter substrate) 10. An opening portion 20a cut out correspondingly to the transmissive display area is formed in a part of the reflective film 20. The portion in which the formation area of the pixel electrode (first electrode) 31 and the formation area of the reflective film 20 overlaps each other forms the reflective display area, and the portion in which the formation area of the pixel electrode 31 and the non-formation area of the reflective film 20 (that is, the formation area of the opening portion 20a) overlap each other forms the transmissive display area. The color filter layer 22 is formed at the inside of the reflective film 20 and the substrate 10. In order to compensate for variation in saturation of a displayed color in the reflective display and in the transmissive display, color material layers with varied color purity may be provided in the reflective display area and the transmissive display area.

On the other hand, at the liquid crystal layer side of the element substrate (first substrate) 25, a pixel electrode 31, a plurality of (three) dielectric protrusions 18, and a vertical alignment film 33 are provided in this order.

An insulating film 21 is formed at the position on the color filter layer 22 corresponding to the reflective display area. The insulating film 21 is made of an organic film such as an acryl resin with a thickness of 2 μm±1 μm. The thickness of the liquid crystal layer 50 in the portion in which the insulating film 21 does not exist is about 2 to 6 μm, and the thickness of the liquid crystal layer 50 in the reflective display area is about a half the thickness of the liquid crystal layer 50 in the transmissive display area. That is, the insulating film 21 serves as a liquid-crystal-layer thickness adjusting layer for varying the thickness of the liquid crystal layer 50 in the reflective display area and the transmissive display area with its thickness, thereby embodying a multi-gap structure. According to the liquid crystal display of the present example, it is possible to a bright and high-contrast display using the above structure. A sloping surface for continuously varying the thickness of the insulating film 21 is formed around the boundary between the reflective display area and the transmissive display area.

In the transflective liquid crystal display device shown in FIG. 15, an image display is performed as follows. First, the light entering the reflective display area from the upside of the element substrate 25 is converted into the circularly-polarized light during passing through the polarizing film 37 and the retardation film 36, and then enters the liquid crystal layer 50. Since the liquid crystal molecules aligned vertical to the substrates at the time of applying no voltage do not have the refractive anisotropy, the entry light passes through the liquid crystal layer 50 with the circular polarization. The entry light reflected by the reflective film 20 and passing again through the retardation film 36 is converted into the linearly-polarized light perpendicular to the transmissive axis of the polarizing film 37. The linearly-polarized light does not pass through the polarizing film 37. On the other hand, similarly, the light entering the transmissive display area from the backlight 60 is converted into the circularly-polarized light during passing through the polarizing film 27 and the retardation film 26, and then enters the liquid crystal layer 50. The entry light passing through the retardation film 36 is converted into the linearly-polarized light perpendicular to the transmissive axis of the polarizing film 37. Since the linearly-polarized light does not pass through the polarizing film 37, black is displayed at the time of applying no voltage in the liquid crystal display device of the present exemplary embodiment (normally black mode).

On the other hand, when an electric field is applied to the liquid crystal layer 50, the liquid crystal molecules are re-aligned parallel to the substrates and show the double refractive operation about the transmitted light. Accordingly, the circularly-polarized light entering the liquid crystal layer 50 in the reflective display area and the transmissive display area is converted into the elliptically-polarized light during passing through the liquid crystal layer 50. Although the entry light passes through the retardation film 36, it is not converted into the linearly-polarized light perpendicular to the transmissive axis of the polarizing film 37 and all or a part thereof passes through the polarizing film 37. Therefore, in the liquid crystal display device according to the present exemplary embodiment, white is displayed at the time of applying a voltage. By adjusting a voltage applied to the liquid crystal layer 50, the gray scale may be displayed.

In this way, the entry light passes through the liquid crystal layer 50 two times in the reflective display area, while the entry light passes through the liquid crystal layer 50 only one time in the transmissive display area. In this case, when the retardation (phase difference) of the liquid crystal layer 50 is varied between the reflective display area and the transmissive display area, a difference in transmittance is caused, so that it is not possible to obtain a uniform image. However, in the liquid crystal display device according to the present exemplary embodiment, since the liquid-crystal-layer thickness adjusting layer 21 is provided, the retardation can be adjusted in the reflective display area. Therefore, a uniform image display can be obtained in the reflective display area and the transmissive display area.

Exemplary Alignment Control Device

FIG. 16 is a plan view illustrating one pixel area of the liquid crystal display device shown in FIG. 15, where the constituent elements of the element substrate are indicated by the solid lines and the constituent elements of the counter substrate are indicated by the dot-dashed lines. As shown in FIG. 16, a plurality of slits 31c is formed toward the center from the longitudinal side in the pixel electrode 31. That is, the pixel electrode 31 disposed correspondingly to one dot area includes three island-shaped sub pixels 32 and connecting portions connecting the sub pixels, and the connecting portions substantially constitute the slits 31c (notched portions of the electrodes) for controlling the alignment of the liquid crystal molecules. The pixel electrode 31 is divided into three sub pixels 32 by the slits 31c, and the respective sub pixels are connected at the center portion thereof. At least one sub pixel of the three sub pixels 32 is assigned and formed correspondingly to the reflective display area. Therefore, on the substrate on which the pixel electrodes 31 are formed, the dielectric protrusion 18, the slit 31c, the dielectric protrusion 18, the slit 31c, and the dielectric protrusion 18 are disposed along the longitudinal direction (longitudinal side) of the pixel electrode 31 in that order.

On the surface of the pixel electrode 31 corresponding to the center portion of the respective sub pixels 32, the dielectric protrusion 18 is formed. The dielectric protrusion 18 is formed approximately in a circular shape in a plan view and approximately in a triangular shape in a cross-sectional view as shown in FIG. 15. That is, the liquid crystal display device of the present example employs the basic structure and operation of the liquid crystal display device 200 according to the second exemplary embodiment shown in FIG. 2, so that a plurality of dielectric protrusions 18 is provided in the same substrate as a plurality of slits 31c which is an alignment control structure.

Using the electrode structure including the sub pixels, a plurality of liquid crystal domains can be formed in one dot area. The corner portions of the sub pixels 32 are cut out, so that the sub pixels 32 have approximately an octagonal shape or a circular shape as seen two-dimensionally. When an electric field is applied to the liquid crystal layer, the liquid crystal molecules 51 fall down vertical to the outlines (the edge portions 31a shown in FIG. 1) of the sub pixels 32. Around the dielectric protrusion 18, the liquid crystal molecules 51 are aligned vertical to the slope surface of the dielectric protrusion 18 at the time of applying no voltage, and the liquid crystal molecules 51 fall down toward the dielectric protrusion 18 as shown in FIG. 16 and the liquid crystal molecules 51 are aligned radially about the dielectric protrusion at time of applying a voltage.

Therefore, a plurality of directors for the liquid crystal molecules can be provided, and thus a liquid crystal display device having a wide viewing angle can be provided. To the contrary, the slits and the dielectric protrusions may be formed in the counter electrode 9.

In the liquid crystal display device according to the present example shown in FIGS. 15 and 16, since the slits 31c and the dielectric protrusions 18 are provided in the pixel electrode 31, it is not necessary to perform the positioning between the slits 31c and the dielectric protrusions 18 when the element substrate 25 and the counter substrate 10 are bonded to each other with the liquid crystal layer 50 therebetween, so that the liquid crystal display device can be easily manufactured and the enhancement of yield can be expected.

Exemplary Electronic Apparatus

Figure 17:
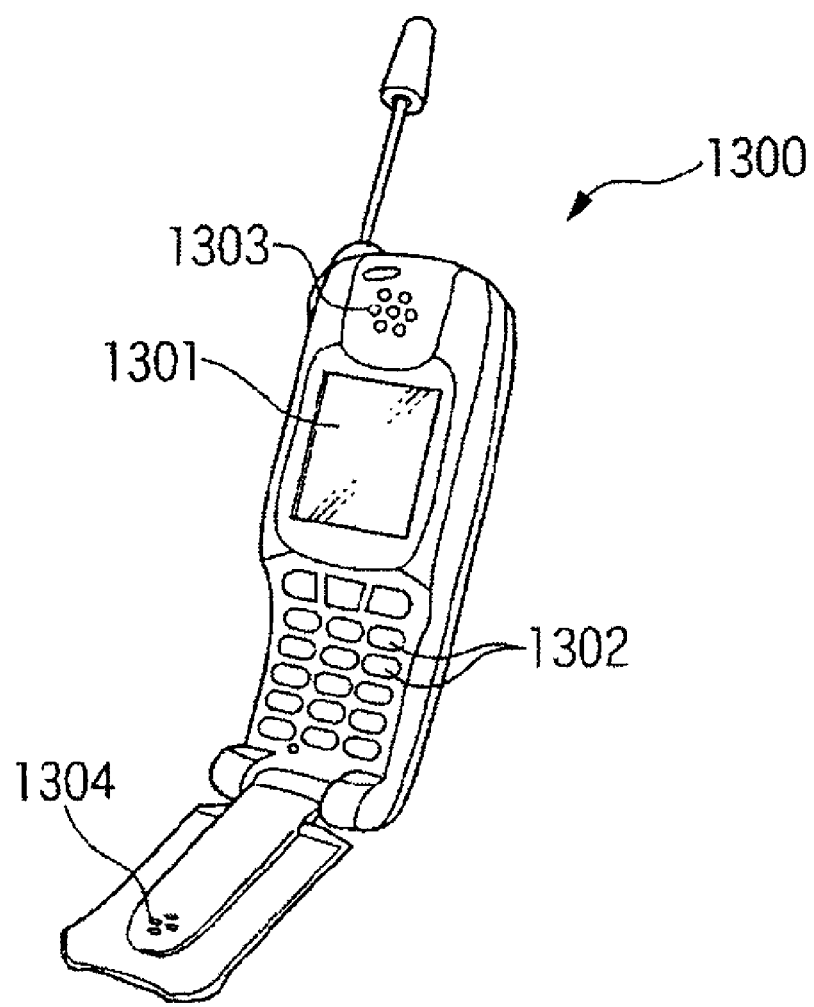
FIG. 17 is a perspective schematic illustrating an example of an electronic apparatus in an exemplary embodiment.

FIG. 17 is a perspective view illustrating an example of an electronic apparatus according to the exemplary embodiments. A mobile phone 1300 shown in FIG. 17 includes the liquid crystal display device according to the exemplary embodiments as a small-sized display unit 1301, and further includes a plurality of manipulation buttons 1302, a receiver 1303, and a transmitter 1304.

The display device according to the aforementioned exemplary embodiments is not limited to the mobile phone, but may be suitably used as an image display device of an electronic book, a personal computer, a digital still camera, a liquid crystal television, a view-finder or monitor direct-view video tape recorder, a car navigation apparatus, a pager, an electronic pocket book, a calculator, a word processor, a work station, a television phone, a POS terminal, an apparatus having a touch panel, and the like. Therefore, in any electronic apparatus, it is possible to perform transmissive or reflective display with a high brightness, a high contrast, and a wide viewing angle.

What is claimed is:

1. A liquid crystal display device, comprising:
    a dot area constituting a unit of display;
    a first substrate and a second substrate;
    a first electrode provided in the dot area on the first substrate;
    a liquid crystal layer including liquid crystal molecules having a negative dielectric anisotropy, the liquid crystal layer being interposed between the first substrate and the second substrate;
    a first dielectric protrusion formed at a side of the first substrate, the liquid crystal molecules and the dielectric protrusion satisfying the expression:

$$\epsilon_\perp > \epsilon_{t1} > \epsilon_{//}$$

$\epsilon_{t1}$ being a dielectric constant of the dielectric protrusion;
    $\epsilon_{//}$ being a dielectric constant of a major axis direction of the liquid crystal molecules; and
    $\epsilon_\perp$ being the dielectric constant of a minor axis direction thereof; and
    an alignment control structure including an opening slit and formed from an opening defined by at least two edge portions of the first electrode on the side of the first substrate, the alignment control structure being provided at a position so as not to overlap with the dielectric protrusion in plan view.

2. The liquid crystal display device according to claim 1, further comprising:
    the alignment control structure being the edge portion of the at least two edge portions of the first electrode closest to the dielectric protrusion.

3. The liquid crystal display device according to claim 1, further comprising:

the alignment control structure further including a second dielectric protrusion having a dielectric constant of $\epsilon_{r2}$ and formed on the first electrode, and the expression $\epsilon_{//} > \epsilon_{r2}$ is satisfied.

4. The liquid crystal display device according to claim 1, further comprising:
the alignment control structure further including:
a second dielectric protrusion on the first electrode;
the opening slit formed by removing a portion corresponding to the second dielectric protrusion out of the first electrode; and
the second dielectric protrusion provided inside the opening slit, the second dielectric protrusion having a second dielectric constant $\epsilon_{r2}$, which satisfies the expression $\epsilon_{//} > \epsilon_{r2}$.

5. A liquid crystal display device, comprising:
a pixel area comprising sub pixel areas;
a first substrate and a second substrate;
an electrode provided in the sub pixel areas;
a liquid crystal layer including liquid crystal molecules having a negative dielectric anisotropy, the liquid crystal layer being interposed between the first substrate and the second substrate;
a first dielectric protrusion having an inclined surface formed at a side of the first substrate in each of the sub pixel areas,
the liquid crystal molecules and the dielectric constants satisfying the expression:

$\epsilon_{\perp} > \epsilon_{//} > \epsilon_{r1}$ $\epsilon_{r1}$ being the dielectric constant of the dielectric protrusion;
$\epsilon_{//}$ being the dielectric constant of a major axis direction of the liquid crystal molecules; and
$\epsilon_{\perp}$ being the dielectric constant of a minor axis direction thereof; and
an alignment control structure formed at a side of the second substrate an alignment control structure being provided at a position so as not to overlap with the dielectric protrusion in a plan view in each of the sub pixel areas, and the alignment control structure being an opening slit formed out of a notched portion of the electrode, the opening slit comprising two edge portions of the electrode, the opening slit formed between two of the sub pixel areas and extending in a direction that bisects the two of the sub pixel areas,
wherein, when a voltage is applied to the electrode, a contact angle between the liquid crystal molecules and the inclined surface of the dielectric protrusion is increased,
the liquid crystal molecules are aligned between the dielectric protrusion and the opening slit, and
when the applied voltage is removed, a disclination of the liquid crystal molecules does not occur.

6. A liquid crystal display device, comprising:
a pixel area comprising sub pixel areas;
a first substrate and a second substrate;
an electrode provided in the sub pixel areas;
a liquid crystal layer including liquid crystal molecules having a negative dielectric anisotropy, the liquid crystal layer being interposed between the first substrate and the second substrate;
a first dielectric protrusion having an inclined surface formed at a side of the first substrate in each of the sub pixel areas, the liquid crystal molecules and the dielectric protrusion satisfying the expression:

$\epsilon_{\perp} > \epsilon_{r1} > \epsilon_{//}$ $\epsilon_{r1}$ being a dielectric constant of the dielectric protrusion;
$\epsilon_{//}$ being a dielectric constant of a major axis direction of the liquid crystal molecules; and
$\epsilon_{\perp}$ being the dielectric constant of a minor axis direction thereof; and
an alignment control structure formed on the side of the first substrate, the alignment control structure being provided at a position so as not to overlap with the dielectric protrusion in plan view in each of the sub pixel areas, and the alignment control structure being an opening slit formed out of a notched portion of the electrode, the opening slit comprising two edge portions of the electrode, the opening slit formed between two of the sub pixel areas and extending in a direction that bisects the two of the sub pixel areas,
wherein, when a voltage is applied to the electrode, a contact angle between the liquid crystal molecules and the inclined surface of the dielectric protrusion is decreased,
the liquid crystal molecules are aligned between the dielectric protrusion and the opening slit, and
when the applied voltage is removed, a disclination of the liquid crystal molecules does not occur.

7. The liquid crystal display device according to claim 1, wherein the opening slit is formed from an opening defined by at least two opposite ends of the first electrode, and the first dielectric protrusion is disposed between the opposite ends of the first electrode.

8. The liquid crystal display device according to claim 7, wherein the first electrode is unitarily formed, the opposite ends of the first electrode defining an entire width of the first electrode.

* * * * *